United States Patent [19]

Upchurch et al.

[11] Patent Number: 5,372,346
[45] Date of Patent: Dec. 13, 1994

[54] CUSHIONED SWIVEL HOOK FOR STRINGED INSTRUMENTS

[76] Inventors: Noel R. Upchurch; Barry W. Bross, both of 7832 W. Manchester Ave., #1, Playa Del Rey, Calif. 90293

[21] Appl. No.: 229,129

[22] Filed: Apr. 18, 1994

Related U.S. Application Data

[63] Continuation of Ser. No. 932,267, Aug. 19, 1992, abandoned.

[51] Int. Cl.$^5$ ............................................. F16M 13/00
[52] U.S. Cl. ...................................... 248/304; 248/341; 248/312; 248/294; 84/327
[58] Field of Search ............... 248/225.2, 222.3, 222.2, 248/304, 307, 301, 303, 339, 497, 489, 309.1, 294, 920, 312, 312.1, 341; 84/327, 453

[56] References Cited

U.S. PATENT DOCUMENTS

| | | | |
|---|---|---|---|
| 1,170,684 | 2/1916 | Schlieckert | 84/327 X |
| 2,656,140 | 10/1953 | Petruschell | 248/294 X |
| 3,045,962 | 7/1962 | Paulus | 248/222.3 |
| 3,548,827 | 12/1970 | Abel | 248/312 X |
| 4,078,753 | 3/1978 | Cole | 248/317 X |
| 4,081,166 | 3/1978 | Lippert | 248/341 X |
| 4,176,580 | 12/1979 | Gallegos | 248/224.1 X |
| 4,666,110 | 5/1987 | Prouty | 248/309.1 X |
| 4,691,610 | 9/1987 | Gilbert | 84/327 |
| 4,740,043 | 4/1988 | Kennamer | 248/294 X |
| 4,953,817 | 9/1990 | Mosteller | 248/304 X |
| 4,991,809 | 2/1991 | Harkey | 248/231.4 |
| 5,224,607 | 7/1993 | Koresko | 248/339 X |

*Primary Examiner*—Karen J. Chotkowski
*Attorney, Agent, or Firm*—Antonio M. Fernandez

[57] ABSTRACT

A wall-mounted hook for hanging a string instrument from a neck proximate a head having pegs for tuning strings comprising a wall-mounting plate having a protruding base, a yoke having a shaft and two prongs extending from said shaft, said prongs being spaced to engage said instrument around said neck thereof proximate said tuning head, and means for securing said shaft to said base and for allowing said yoke to swivel on said base about an axis of said shaft.

1 Claim, 2 Drawing Sheets

CUSHIONED SWIVEL HOOK FOR STRINGED INSTRUMENTS

This application is a continuation of application Ser. No. 07/932,267, filed Aug. 19, 1992 and now abandoned.

FIELD OF THE INVENTION

The invention relates to a wall-mounted hook from which is hung a stringed musical instrument having a large flat-backed sound box and a long neck.

BACKGROUND OF THE INVENTION

It is customary to store a stringed musical instrument when not in use in such a way as to protect its sound box, neck and tuning head from damage due to something being dropped on it or something bumping into it. The slightest crack in the sound box, which is normally made of thin sheets of wood, will totally destroy the musical sound that it is expected to produce, and the slightest bump on a tuning key may cause the tuning pin to loosen its attached string so that retuning the instrument becomes necessary.

Small instruments, such as a violin, are normally stored in its carrying case while not in use, and very large instruments, such as a bass violin, which is sometimes plucked rather than played with a bow, are normally stored up right in a stand. But there is no convenient way to store stringed instruments of intermediate sizes, such as guitars, including electronic guitars, except in their carrying case. Since such instruments are quite large, as compared to a violin (or fiddle), it is customary not to store the instrument in a case except for carrying, and sometimes not even then.

An object of this invention is to provide a way to store a stringed instrument of intermediate size having a large sound box (or the equivalent in an electronic guitar) that is substantially flat-backed and has a long neck for strings stretched across an opening in the sound box (or the equivalent in an electronic guitar) to tuning pins in a head at the end of the neck.

SUMMARY OF THE INVENTION

In accordance with the present invention, a wall mounted hook is provided with two prongs coated with resilient material to form a yoke closely fitted around the neck of the instrument proximate the tuning head from which the instrument is hung. The prongs extend from a base on a wall plate to engage the instrument around the neck proximate the head, and at the same time slope down and then up under the instrument head at the end of the neck like tines of a fork under the head. The ends of the prongs turn up sharply to prevent the instrument from sliding off the prongs, as may be the case in the event of an earthquake, for example.

Since the head designs of such stringed instruments are not always symmetrical, particularly in the case of electronic guitars, the head may extend on one side further down the neck than the other. Consequently, the instrument will not hang down straight, and if not, the head may not rest on a prong on one side of the yoke. In that case, the instrument may not hang securely. Consequently, the base of the yoke is mounted on a wall plate by swivel means to allow the yoke to turn on an axis of the base until the instrument hangs with its center of gravity on a vertical axis intersecting the axis of the base. This swivel means thus permits the wall mounted yoke-type hook to self adjust so that the instrument hangs securely straight down with the head on both sides of the neck resting on a prong of the yoke.

DESCRIPTION OF PREFERRED EMBODIMENTS

Figure 1:
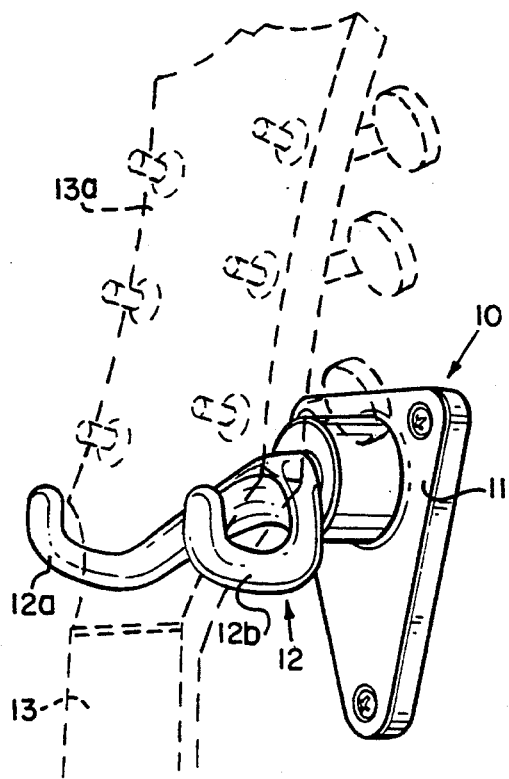
FIG. 1 illustrates a stringed instrument hook in accordance with the present invention for securely hanging a guitar shown in phantom lines.

FIG. 1 illustrates a preferred embodiment of a hook 10 wall-mounted by screws through holes in a metal plate 11. The hook is shown in use for hanging a guitar (shown in phantom lines) from its yoke 12 comprising two prongs 12a and 12b coated with resilient material, preferably rubber, closely fitted around the neck 13 of the guitar proximate the tuning head 13a.

Figure 2:
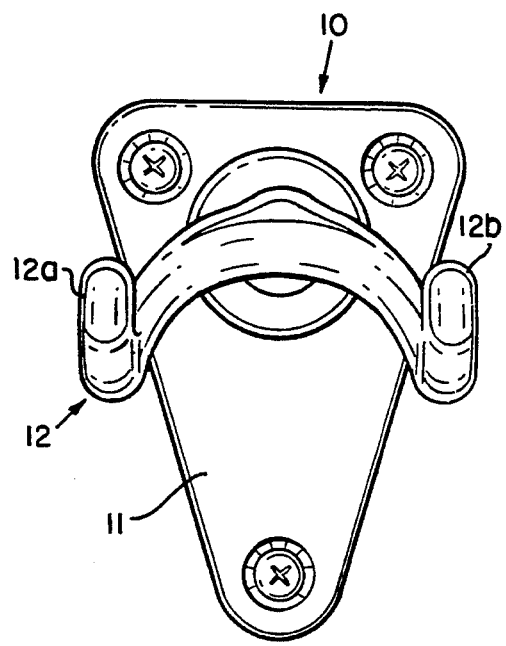
FIG. 2 illustrates a front elevation view of the instrument hook in FIG. 1.
Figure 3:
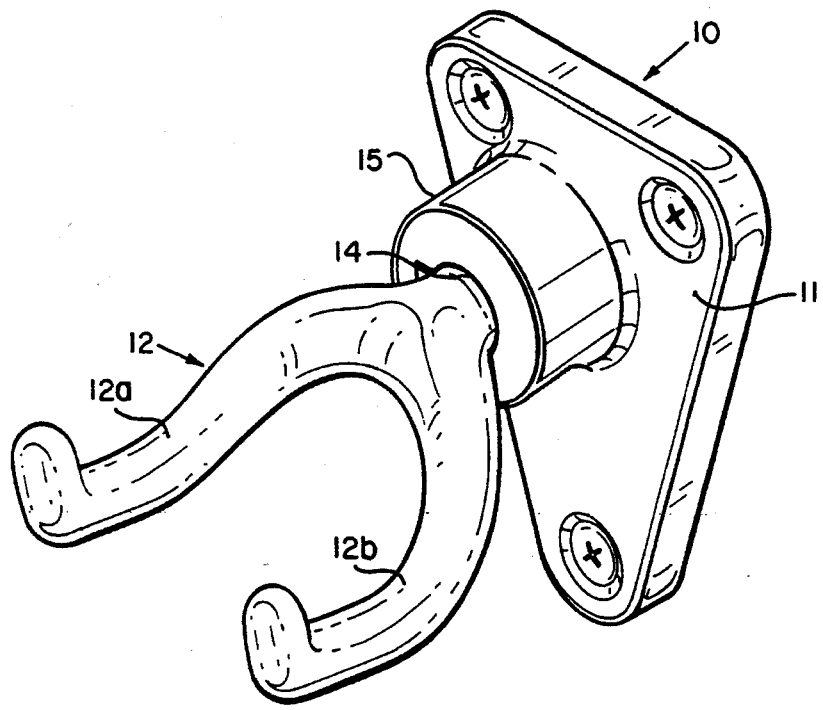
FIG. 3 is a perspective view of the instrument hook in FIG. 1.

In this illustration, the head of the guitar is shown to be symmetrical so that the guitar is in fact suspended from the hook prongs against the bottom of the head with the yoke 12 horizontal, as shown in FIG. 2. In some instances, the head is not symmetrical, and when one side of the head extends further down the neck than on the other side, the guitar would not hang vertically because the one side would engage a prong while the other would not. Consequently, the hook 12 of two prongs 12a and 12b is provided with means for a shaft 14 shown in FIG. 3 to swivel in a cylindrical base 15 case as a unitary part of the plate 11. The guitar having an unsymmetrical head will then cause the yoke to swivel until the guitar is hanging in a vertical position with both sides of the head resting on the prongs 12a and 12b.

Figure 4:
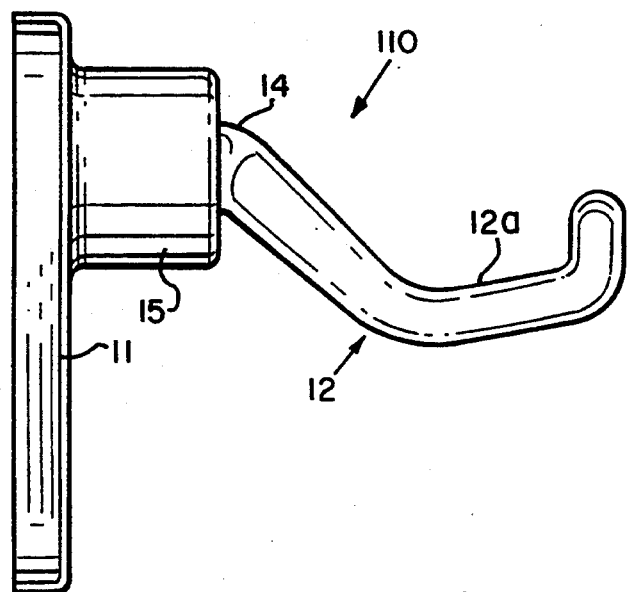
FIG. 4 is a side elevation view of the instrument hook in FIG.

The guitar head 13a cannot slip off the ends of the prongs 12a and 12b because they not only slope down and then up like tines of a fork in order to cradle the head of the guitar, but also are turned up sharply at their ends, as shown in FIG. 4. The extent of the downward slope is made sufficient to assure that the guitar head will be positioned a distance from the wall on which the plate 11 is mounted just enough for the back of the guitar sound box to be clear of the wall. The extent of the upward slope is then made sufficient to accommodate the thickness of the guitar head.

Figure 5:
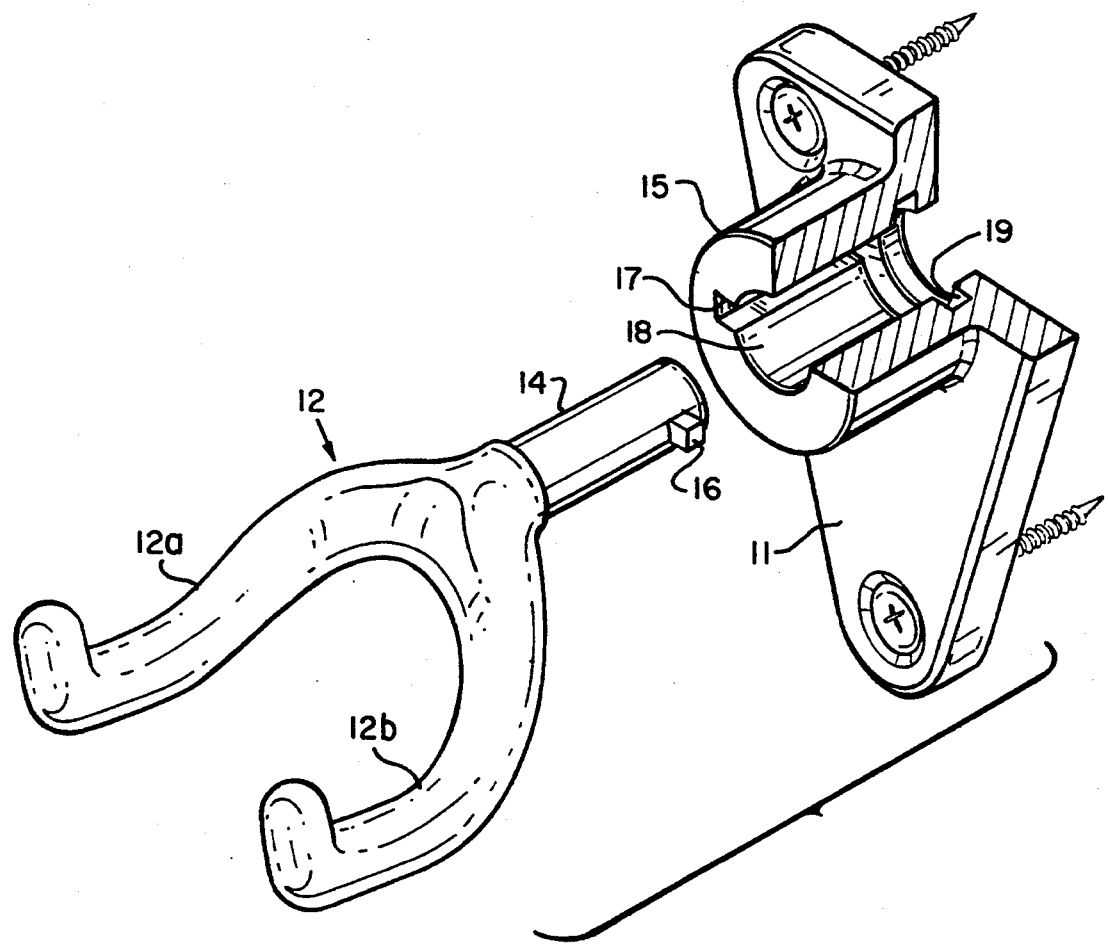
FIG. 5 is an exploded view of the instrument hook in FIG. 3 with a quarter section of the base cut away to show a key way and annular groove for a key lobe on a shaft of the two-pronged hook to allow the shaft to be inserted into the base, while the hook is rotated to an inverted position, and then to allow the hook turned to its upright position shown in FIG. 2.

The preferred means for allowing the yoke to swivel in the cylindrical box 15 will now be described with reference to FIG. 5. The shaft 14 is provided with a square or cylindrical projection 16 on the right side as viewed in FIG. 5 which fits into a square channel 17 cut in the cylindrical wall 18 of the base 15. An annular square channel 19 is also cut in the plate 11 just under the cylindrical base 15. The yoke 12 is shown in its normal orientation. To insert its shaft 14 into the cylindrical base 15, the yoke must be rotated 180° until its prongs 12a and 12b are inverted. Once the shaft is inserted by passing the square projection 16 along the channel 17 and the projection 16 reaches the annular square channel, the yoke 12 is again rotated 180° to place it in the position shown in FIG. 3. The yoke 12 may then swivel almost 180° in either clockwise of counter clockwise direction without risk of the shaft slipping out of the base. The yoke cannot slide out because of the projection 16 in the annular channel 19, but it may swivel to allow any guitar hung on the yoke 12 to seek a position with the center of gravity of the guitar positioned on a vertical plane passing through the axis of the shaft 14.

The shaft 14 and prongs 12a and 12b of the yoke 12 are cast in metal, as is the wall-mounted plate and cylindrical base 15, in order to support heavy string instruments such as electronic guitars. However, these parts may be cast in any rigid material, such as Bakelite, which is not subject to cold under the weight of the string instrument at normal room temperature ranges. However, metal is preferred because of its greater strength.

The means for allowing the yoke 12 to swivel on the base 15 may be implemented in other ways, such as by forming the base 15 to be solid and of smaller diameter and forming the shaft 14 to be a hollow cylinder that fits over the solid cylindrical base. The function of the projection 16 and annular square channel 19 in preventing the yoke from sliding off the base may be accomplished by forming an annular ridge on the wall inside the hollow cylindrical shaft with an internal diameter just slightly greater than the outer diameter of the solid cylindrical base. An annular groove is then formed on the solid cylindrical base to receive the annular ridge on the inside wall of the hollow shaft. Once the ridge snaps into the annular groove, the yoke cannot slide off the base under normal use.

Still other modifications and materials will occur to those skilled in the art. Consequently, it is intended that the claims be interpreted to cover equivalent modifications and materials.

We claim:

1. A wall-mounted hook for hanging a string instrument from a neck proximate a head having pegs for tuning strings comprising a wall-mounting plate having a protruding base, a yoke having a smooth shaft and two prongs extending from said shaft, said prongs being spaced to engage said instrument around said neck thereof proximate said tuning head and to swivel as much as necessary for said instrument to hang freely on said wall-mounted hook, means for securing said shaft in a bore through said base having a smooth cylindrical wall and for allowing said yoke to swivel in said bore about an axis of said shaft, and said prongs slope downwardly from said smooth shaft a predetermined extent and then slope upwardly to a point near the free ends of said prongs where said free ends of said prongs are abruptly turned up to a position approximately parallel with said wall-mounted plate thereby causing an instrument to hang on said hook with said head resting on said prongs in a position approximately where said downward slope meets said upward slope.

* * * * *